March 10, 1964 W. A. ROWLETT 3,124,394
IDLER ARM REPAIR KIT
Filed Oct. 27, 1961

WILLARD A. ROWLETT
INVENTOR.

BY
Robert K. Rhea
AGENT

United States Patent Office 3,124,394
Patented Mar. 10, 1964

3,124,394
IDLER ARM REPAIR KIT
Willard A. Rowlett, P.O. Box 14-W,
Oklahoma City, Okla.
Filed Oct. 27, 1961, Ser. No. 148,219
4 Claims. (Cl. 308—36)

The present invention relates to automobiles and more particularly to a repair or replacement kit for new and worn idler arm bearings and brackets of automobiles.

It is conventional practice, at present, to equip the right-hand side of the steering mechanism of an automobile with an idler arm to support that side of the steering means. The idler arm comprises a relatively short member which is pivotally connected at one end to the adjacent righthand end portion of the tie rod and is pivotally connected at its opposite end to a bracket carried by the frame of the vehicle. The purpose of the idler arm is to add support and stability to the steering mechanism and effect easier steering. Since the idler arm assembly is continuously exposed to the weather, sand, grit and foreign matter, enters the connections of most conventional idler arms and in as much as the idler arm bearings are subjected to continuous oscillating movement, the conventional bearings wear rapidly. One type of idler arm conversion kit is disclosed in Patent No. 2,826,466, issued to Arnold J. Pritchard on March 11, 1958, wherein bearings securely maintain the idler arm connected to its bracket. A similar means for connecting an oscillating member to a fixed shaft is disclosed in Patent No. 2,392,633, issued to Carroll M. Bierman, dated January 8, 1946. Each of the above patents connect the relative oscillating parts by bearings but do not provide a means for maintaining a snug fit between mating parts throughout the life of the devices.

It is, therefore, the principal object of the instant invention to provide a bearing means for interconnecting an idler arm bracket to its support wherein the bearing means is spring-loaded to maintain the component parts of the bearing under a desired tension.

Another object is to provide a device of this class which, when installed on a vehicle, effects a permanent repair, lasting substantially as long as the vehicle is used.

Another object is to provide a device of this class comprising relatively few moving parts which are formed of antifriction material.

Another important object is to provide a bearing means for interconnecting the ends of the idler arm with the tie rod and idler arm bracket which will eliminate idler arm wear, rattle, sagging and looseness of its connection.

A further object is to provide bearing means of this type by which a positive setting of wheel toe and alignment may be achieved and which will be maintained under road shock encountered by the vehicle wheels.

Yet another object is to provide a device of this class which effects easier steering and control of the vehicle and prevents extensive tire wear by preventing constant caster and camber changes.

The present invention accomplishes these and other objects by providing a housed bearing means which may be inserted into the bore of an idler arm around the fixed shaft of an idler arm bracket and which includes resilient means for maintaining the component parts of the bearing under tension.

Other objects will be apparent from the following description when taken in conjunction with the accompanying single sheet of drawings, wherein.

Like characters of reference designate like parts in those figures of the drawings in which they occur.

In the drawings.

Figure 1:
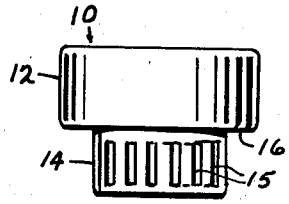
FIGURE 1 is a side elevational view of the assembled bearing, per se.
Figure 2:
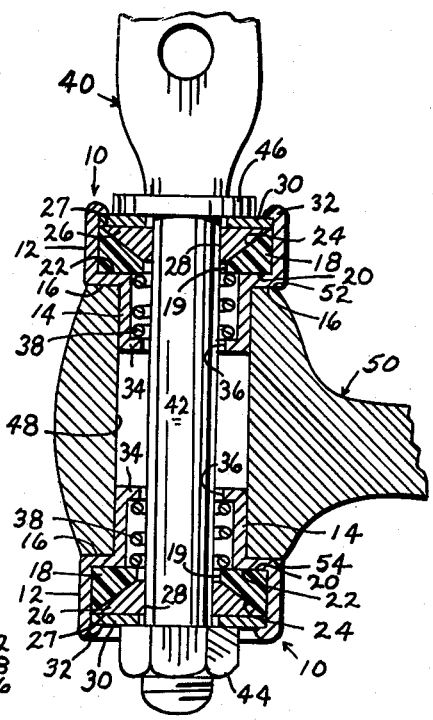
FIGURE 2 is a vertical cross-sectional view, partly in elevation, illustrating a pair of the bearings connecting one end of an idler arm to its supporting bracket; and, FIGURE 3 is a view similar to FIG. 2 illustrating an alternate arrangement of the bearing means.

The reference numeral 10 indicates the device, as a whole, which is cylindrical in general configuration, having a bearing receiving end portion 12 and a coaxial reduced cylindrical portion 14 forming an annular shoulder 16. A circumferential portion of the outer surface of the end portion 14 is scored or knurled, as at 15, for the purposes which will readily be apparent. A bearing race 18 is closely received by the inner surface of the housing wall 12. The race 18 is preferably formed of highly flexible material having a high density such as polyethylene derived from a petroleum resin presently marketed under the tradenames Marlex, Teflon and nylon. This material has an inherent anti-friction quality and must be caged or enclosed when used as a bearing and placed under pressure. The race has an end surface 20 flatly contacting the inner surface 22 of the annular shoulder 16. The race is further characterized by a frustum or conical-shaped recess 24 extending outwardly from the wall defining the bore 19 of the race. A frustro conical-shaped bearing member 26, preferably formed of metallic or synthetic resin material, having a central bore 28, of a selected diameter, is received within the housing end portion 12 and nested by the conical recess 24 of the race 18. A washer-like cap 30 is positioned against the outwardly disposed end surface 27 of the bearing 26. The free end edge portion of the housing wall 12 is spun inwardly to overlie, in contacting relation, a circumferential portion of the outer surface of the cap 30, as at 32.

A portion of the free end of the wall of the reduced end portion 14 extends inwardly substantially perpendicular to the plane of the wall of the reduced end portion to form an annular shoulder or flange 34 and define a central opening 36. A helical spring 38 is interposed between the annular shoulder 34 and the adjacent end surface of the bearing race 18.

The reference numeral 40 indicates an idler arm bracket secured to a vehicle, not shown, and includes a shaft or bolt-like portion 42 having a nut 44 threadedly connected to the free end thereof while an annular flange or shoulder 46 defines the end of the shaft opposite the nut. The shaft 42 is loosely received within the bore 48 of a conventional idler arm 50. The conventional idler arm bushings or bearings, not shown, are removed and one of the bearing housings 10 is positioned on the idler arm at the respective ends of the bore 48 with the reduced end portion 14 of each housing closely received within the respective end portions of the idler arm bore. This positions the annular shoulder 16, of the respective bearing, adjacent the surfaces 52 and 54 of the idler arm. The bore 28 of the bearing 26 is preferably formed to closely receive the shaft 42. The nut 44 is tightened on the shaft 42 to impinge the idler arm and assembled bearings between the nut and the adjacent surface of the shoulder 46. Thereafter rotative movement of the idler arm 50, relative to the shaft 42, rotates the bearing housing and the race 18 permitting the conical surface of the bearing 26 to slide or rotate against the wall forming the conical recess 24. The purpose of the spring 38 is to maintain a constant tight fitting relation between the bearing 26 and race 18 so that any wear of the bearing surfaces will be compensated for by expansion of the respective spring 38, thus insuring a tight fitting bearing connection between the idler arm bracket 40 and idler arm 50 throughout the life of the vehicle.

Figure 3:
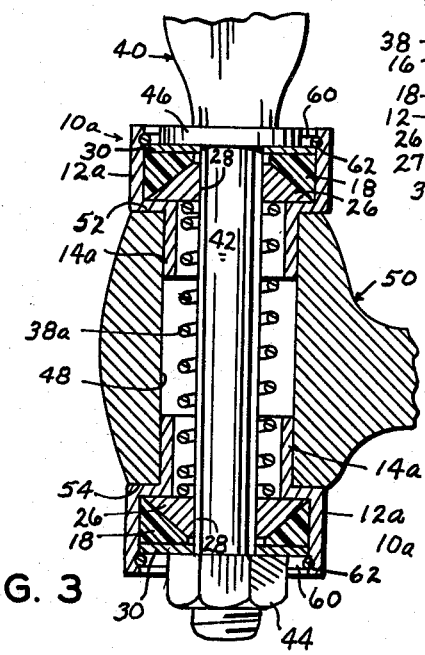

An alternate arrangement of the device 10a is illustrated in FIG. 3 wherein the respective positions of the race 18 and bearing 26 are inverted. A snap ring 60, seated within a groove 62 formed in the inner surface of the housing wall 12a, maintains the bearing and race in place. The inwardly disposed end of the reduced end portion 14a omits the flange or annular shoulder 34. An elongated helical spring 38a is interposed between the respective bearings or cones 26 around the shaft 42. The operation of the alternate device 10a is identical to that disclosed hereinabove for the device 10.

Obviously the invention is susceptible to some change or alteration without defeating its practicability, and I therefore do not wish to be confined to the preferred embodiment shown in the drawings and described herein, further than I am limited by the scope of the appended claims.

I claim:

1. Bearing means for interconnecting an idler arm and idler arm bracket for pivoting movement of the idler arm relative to the idler arm bracket, said idler arm bracket having an annular shoulder surrounding a fixed shaft, said idler arm having a bore loosely surrounding said shaft, said bearing means, comprising: a cylindrical housing having an outer wall diametrically reduced at one end portion and closely received by the bore in said idler arm; a first centrally bored antifriction member closely surrounding said shaft within said housing; a second centrally bored antifriction member loosely surrounds said shaft within said housing and contiguously contacting the adjacent surface of said first antifriction member; and a spring positioned within the reduced end portion of said housing in contact with the adjacent surface of said first antifriction member.

2. Bearing means for interconnecting an idler arm and idler arm bracket for pivoting movement of the idler arm relative to the idler arm bracket, said idler arm bracket having an annular shoulder surrounding a fixed shaft, said idler arm having a bore loosely surrounding said shaft, said bearing means, comprising: a cylindrical housing having an outer wall diametrically reduced at one end portion and closely received by one end portion of the bore in said idler arm, said housing wall forming an annular shoulder intermediate its ends; a first centrally bored antifriction member surrounding said shaft and positioned adjacent the shoulder within said housing; a second centrally bored antifriction member surrounding said shaft within said housing and contiguously contacting the adjacent surface of said first antifriction member; and a spring positioned within the reduced end portion of said housing in contact with the adjacent surface of said first antifriction member.

3. An idler arm conversion kit for interconnecting an idler arm and idler arm bracket for pivoting movement of the idler arm relative to the idler arm bracket, said idler arm bracket having an annular shoulder surrounding a fixed shaft, said idler arm having a bore loosely surrounding said shaft, comprising: a cylindrical housing having a wall diametrically reduced at one end portion and closely received within one end portion of the bore in said idler arm; a bearing race within said housing, said bearing race having a frustum-shaped recess; a frustro-conical shaped bearing nested by the recess in said bearing race; and spring means within the reduced end portion of said housing in contact with said bearing race.

4. An idler arm conversion kit for interconnecting an idler arm and idler arm bracket, said idler arm having a bore in one end, said idler arm bracket having a shaft loosely received by the bore in said idler arm, comprising: a housing having a wall forming an annular shoulder, intermediate its ends, positioned on a surface of the idler arm at one end of the bore and defining a reduced end portion of said housing closely received by the wall forming the bore in said idler arm, the inwardly disposed end of said reduced end portion of said housing having an inwardly directed annular shoulder; bearing means within said housing contacting the inner wall of the latter and contiguously surrounding a peripheral portion of said shaft, said bearing means comprising first and second antifriction members, said first antifriction member having a frustum-shaped recess loosely surrounding said shaft, said second antifriction member having a bore snugly surrounding said shaft and having a frustro-conical shaped surface contiguously contacting the frustum-shaped recess of said first antifriction member; and spring means within the reduced end portion of said housing and interposed between said bearing means and the inwardly directed shoulder of the reduced end portion of said housing.

References Cited in the file of this patent

UNITED STATES PATENTS

| | | |
|---|---|---|
| 1,362,910 | Zoeller et al. | Dec. 21, 1920 |
| 2,857,214 | Kogstrom et al. | Oct. 21, 1958 |